United States Patent
Davis et al.

(10) Patent No.: US 10,186,348 B2
(45) Date of Patent: Jan. 22, 2019

(54) SYSTEM AND METHOD FOR APPLYING COATING ON OVERHEAD POWER TRANSMISSION CONDUCTORS USING AN UNMANNED AERIAL VEHICLE

(71) Applicant: GENERAL CABLE TECHNOLOGIES CORPORATION, Highland Heights, KY (US)

(72) Inventors: Cody R. Davis, Maineville, OH (US); Srinivas Siripurapu, Carmel, IN (US); Sathish Kumar Ranganathan, Avon, IN (US); Vijay Mhetar, Carmel, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 15/406,429

(22) Filed: Jan. 13, 2017

(65) Prior Publication Data
US 2017/0200530 A1 Jul. 13, 2017

Related U.S. Application Data

(60) Provisional application No. 62/278,247, filed on Jan. 13, 2016.

(51) Int. Cl.
*H01B 7/29* (2006.01)
*B05C 5/00* (2006.01)
(Continued)

(52) U.S. Cl.
CPC .............. *H01B 7/292* (2013.01); *B05C 5/00* (2013.01); *H01B 7/28* (2013.01); *H02G 1/00* (2013.01);
(Continued)

(58) Field of Classification Search
CPC . H02G 1/00; H02G 1/02; H01B 7/292; H01B 7/28; B64C 39/024; B64C 2201/024; B64C 2201/042; B64C 2201/146; B64C 2201/12; B08B 1/04; B08B 3/04; B08B 1/002; B60L 5/005; B60L 11/185;
(Continued)

(56) References Cited

U.S. PATENT DOCUMENTS 7,398,946 B1 7/2008 Marshall
9,741,467 B2 8/2017 Ranganathan et al.
(Continued)

FOREIGN PATENT DOCUMENTS

| WO | 2013155653 A1 | 10/2013 |
| WO | 2014184146 A1 | 11/2014 |
| WO | 2017083689 A1 | 5/2017 |

OTHER PUBLICATIONS

English MachineTranslation of WO/2013/155653, Wenbo et al, published Oct. 24, 2013.*
(Continued)

*Primary Examiner* — Laura Edwards
(74) *Attorney, Agent, or Firm* — Ulmer & Berne LLP

(57) ABSTRACT

Systems and methods of coating an installed overhead conductor with an unmanned aerial vehicle are disclosed. The unmanned aerial vehicles can attach to an installed overhead conductor and can apply a coating composition from one or more canisters.

10 Claims, 3 Drawing Sheets

(51) Int. Cl.
*H01B 7/28* (2006.01)
*H02G 1/00* (2006.01)
*H02G 1/02* (2006.01)
*B64C 39/02* (2006.01)
*B08B 3/04* (2006.01)
*B08B 1/00* (2006.01)
*B05C 9/10* (2006.01)
*B05C 9/12* (2006.01)
*B05C 9/14* (2006.01)

(52) U.S. Cl.
CPC ............... *H02G 1/02* (2013.01); *B05C 9/10* (2013.01); *B05C 9/12* (2013.01); *B05C 9/14* (2013.01); *B08B 1/002* (2013.01); *B08B 3/04* (2013.01); *B64C 39/024* (2013.01); *B64C 2201/024* (2013.01); *B64C 2201/146* (2013.01)

(58) Field of Classification Search
CPC .... B25J 11/0085; G01R 15/14; B05B 13/005; B05B 9/0404; B05C 5/00; B05C 9/10; B05C 9/12; B05C 9/14
USPC .................................................. 118/72, 300
See application file for complete search history.

(56) References Cited

U.S. PATENT DOCUMENTS

| | | |
|---|---|---|
| 2011/0215790 A1 | 9/2011 | Hyde et al. |
| 2013/0277082 A1 | 10/2013 | Hyde et al. |
| 2014/0041925 A1 | 2/2014 | Davis et al. |
| 2015/0274294 A1* | 10/2015 | Dahlstrom ............... B64D 1/18 239/722 |
| 2015/0353737 A1 | 12/2015 | Siripurapu et al. |
| 2016/0082456 A1* | 3/2016 | Tada ................... B05B 11/3077 222/321.9 |
| 2016/0376031 A1* | 12/2016 | Michalski ............... B64F 1/36 701/15 |
| 2017/0137659 A1 | 5/2017 | Ranganathan et al. |

OTHER PUBLICATIONS

Copenheaver, Blaine; International Search Report and Written Opinion of the International Searching Authority, issued in International Application No. PCT/US2017/013520; dated Apr. 4, 2017; 8 pages.

\* cited by examiner

SYSTEM AND METHOD FOR APPLYING COATING ON OVERHEAD POWER TRANSMISSION CONDUCTORS USING AN UNMANNED AERIAL VEHICLE

REFERENCE TO RELATED APPLICATIONS

The present applications claims the priority benefit of U.S. provisional patent application Ser. No. 62/278,247, entitled SYSTEM AND METHOD FOR INCREASING HEAT DISSIPATION FROM OVERHEAD POWER TRANSMISSION CONDUCTORS USING AN UNMANNED AERIAL VEHICLE, filed Jan. 13, 2016, and hereby incorporates the same application herein by reference in its entirety.

TECHNICAL FIELD

The present disclosure generally relates to the field of power transmission conductors.

BACKGROUND

As the demand for electricity grows, there is a need for power transmission conductors with increased current carrying capacity. The amount of power a transmission line can deliver is dependent on the current-carrying capacity (ampacity) of the line. However, a power transmission conductor's current carrying capacity is limited, in part, by its maximum safe operating temperature. Exceeding this temperature can result in damage to the conductor or to the transmission and distribution line accessories.

A conductor's temperature is determined by the cumulative effect of heating and cooling on the power line. The conductor is heated by Ohmic losses and solar heat and cooled by conduction, convection and radiation. The amount of heat generated due to Ohmic losses depends on the current (I) and the electrical resistance (R) of the conductor and is determined by the relationship that Ohmic losses=$I^2R$. Electrical resistance (R) itself is further dependent on temperature with increasing temperatures increasing the resistance (R). As such, higher current and temperature leads to higher electrical resistance, which, in turn, leads to greater electrical losses in the conductor. Newly installed transmission lines can include heat emissive coatings. There is a need, however, for a system and a method to apply heat emissive coatings to existing power transmission conductors to increase their current carrying capacity. Such systems and methods can also be useful to apply other overhead conductor coatings.

SUMMARY

According to one embodiment, a system includes one or more unmanned aerial vehicles ("UAVs"). Each of the UAVs includes an overhead conductor clamping member including one or more coating apertures and one or more canisters. Each of the one or more canisters can be Tillable with a coating composition and can be fluidly connected to at least one of the one or more coating apertures. The overhead conductor clamping member attaches to an installed overhead conductor.

According to another embodiment, a method of coating an installed overhead conductor includes attaching an unmanned aerial vehicle ("UAV") to the overhead conductor with an overhead conductor clamping member and applying a coating composition to the installed overhead conductor.

DETAILED DESCRIPTION

Figure 1:
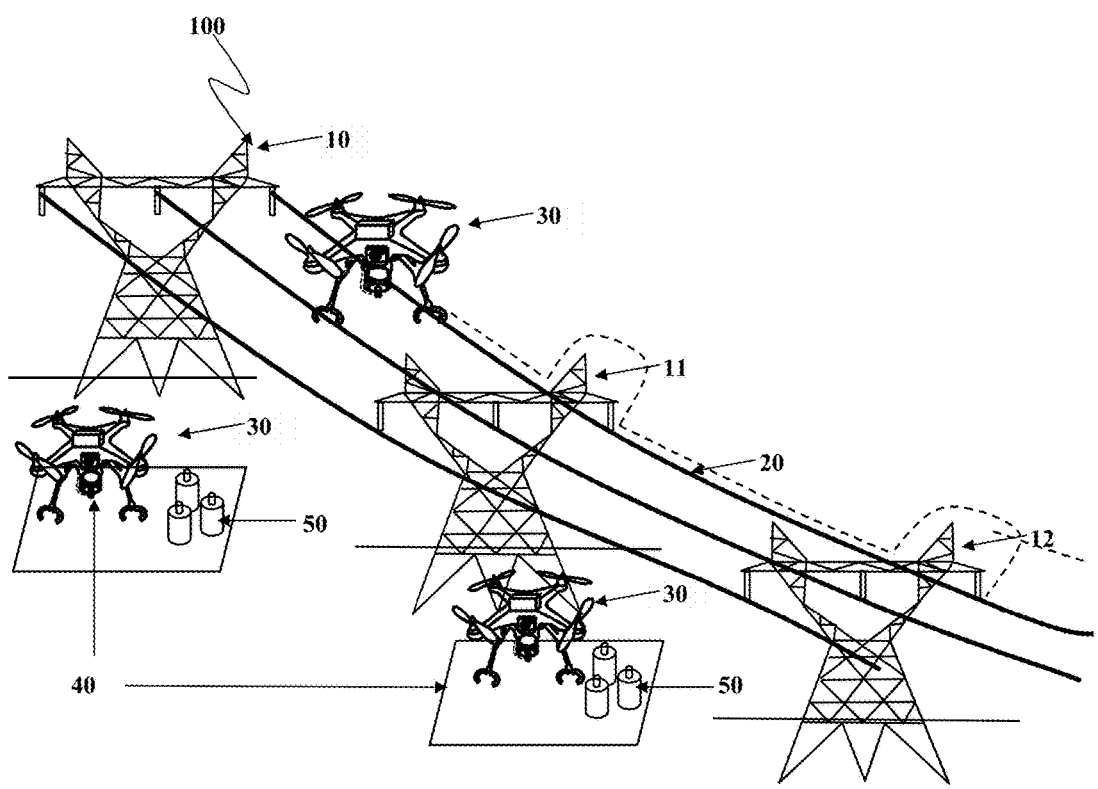
FIG. 1 depicts a perspective view of a coating system, in accordance with one embodiment.
Figure 2:
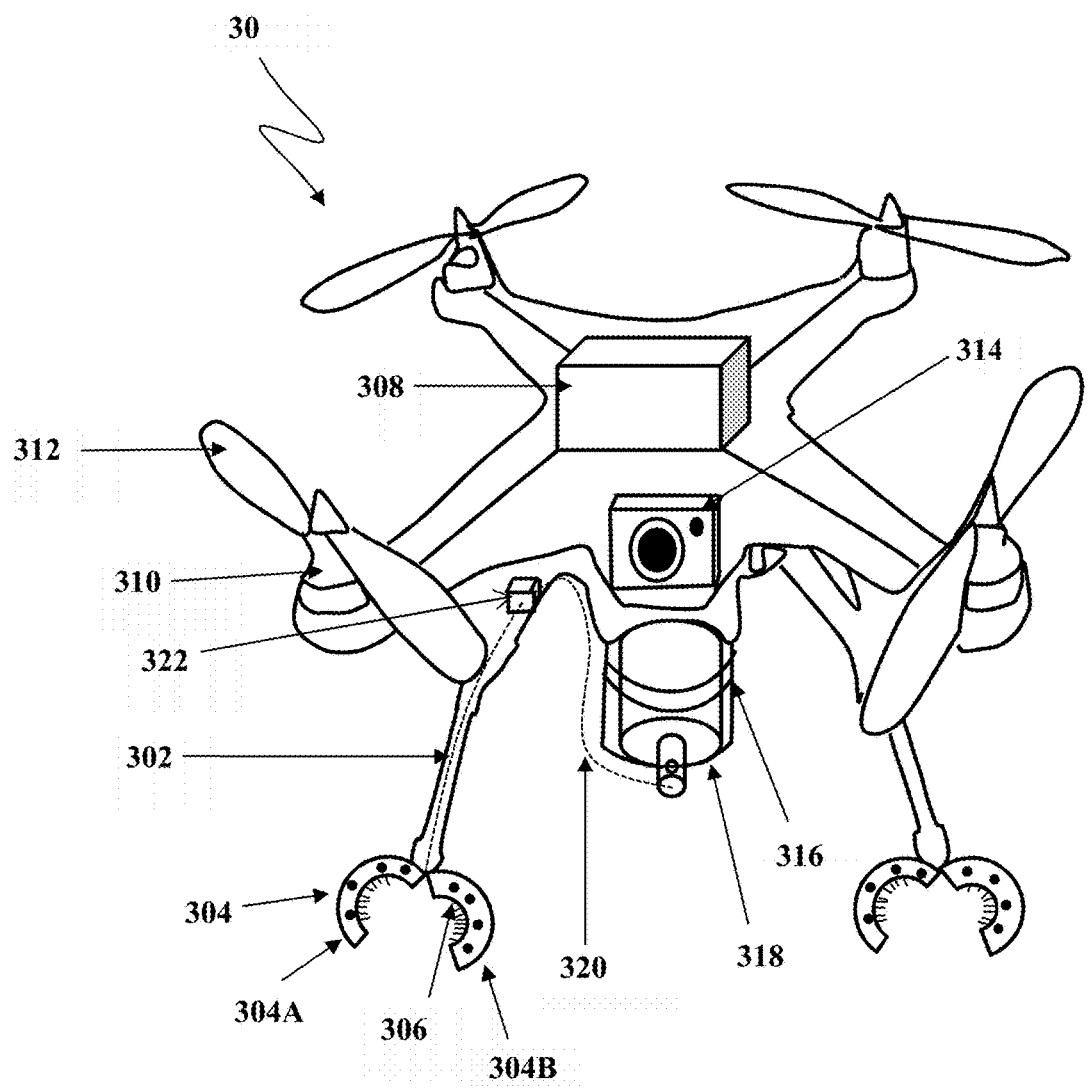
FIG. 2 depicts a perspective view of an unmanned aerial vehicle ("UAV") according to one embodiment.
Figure 3:
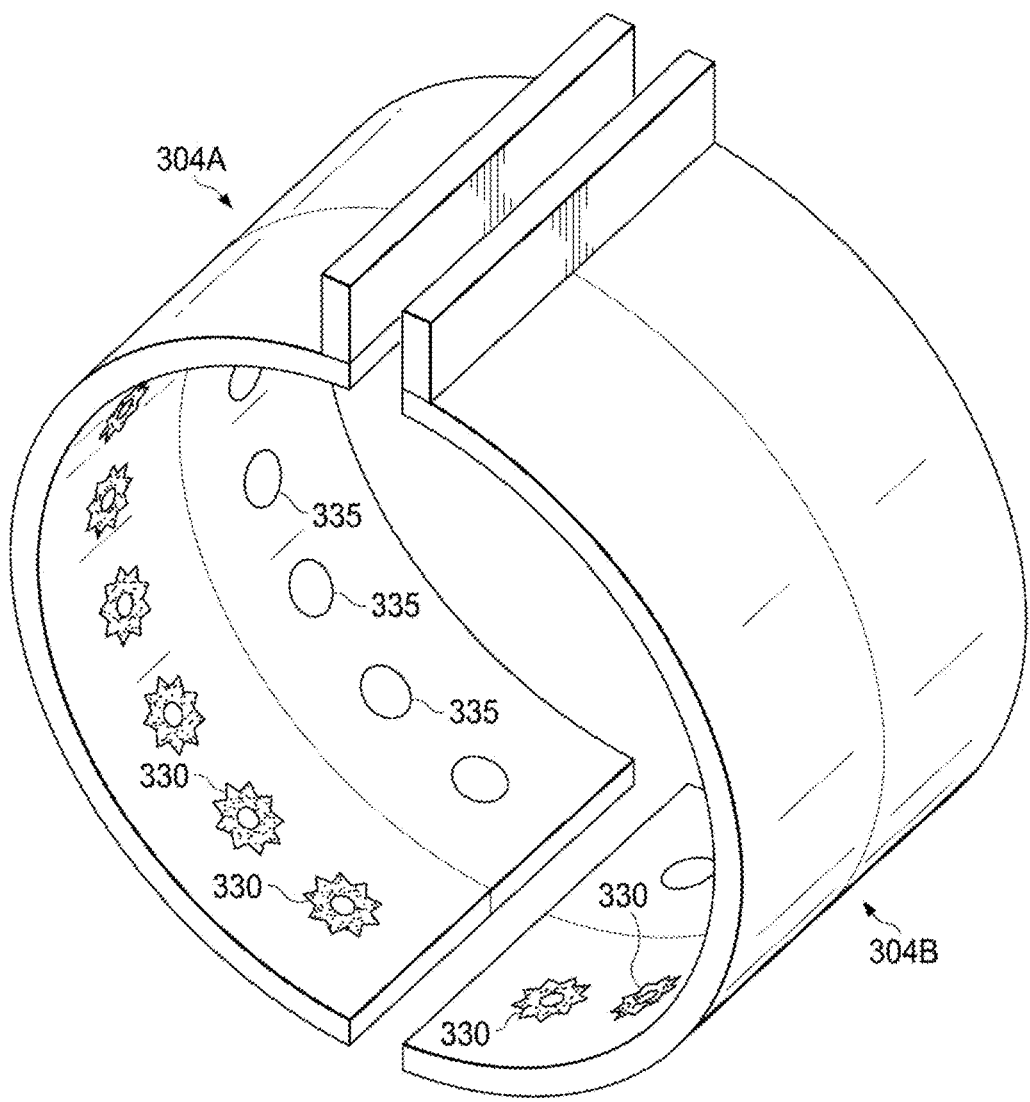
FIG. 3 depicts an enlarged isometric view of a clamp of the UAV depicted in FIG. 2.

A system and a method for coating overhead power transmission conductors with a heat emissive coating composition using an unmanned aerial vehicle ("UAV") are described herein. Certain embodiments are depicted in FIGS. 1 to 3. The embodiments depicted are non-limiting and depict suitable examples of the systems and methods described herein. Descriptions of well-known components and processing techniques are omitted so as to not unnecessarily obscure the embodiments herein. The examples used herein are intended merely to facilitate an understanding of ways in which the embodiments herein can be practiced. Accordingly, the examples should not be construed as limiting the scope of the embodiments herein.

The description of the embodiments herein will describe the general nature of certain embodiments. Others can, by applying current knowledge, readily modify and/or adapt such embodiments for various applications without departing from the concepts described herein, and as such, such adaptations and modifications are intended to be comprehended within the meaning and range of equivalents of the disclosed embodiments. It is to be understood that the phraseology or terminology employed herein is for the purpose of description and not of limitation. Therefore, while the embodiments herein have been described in terms of certain embodiments, those skilled in the art will recognize that the embodiments herein can be practiced with modification and that such modifications are within the spirit and scope of the embodiments as described herein.

FIG. 1 illustrates a perspective view of a coating system 100 for coating one or more overhead power transmission conductors 20 using a UAV 30. The power transmission conductors 20 are suspended between pylons and towers 10, 11, 12. Pylons and towers are typically metallic structures which support the installation and operation of overhead transmission conductors 20 over large distances.

The coating system 100, as described herein, can include at least one UAV 30 and at least one ground support station 40. As can be appreciated, the number of UAVs, ground support stations and coating canisters can vary depending on factors such as the length of the overhead conductor to be coated.

In certain embodiments, the transmission conductors 20 can formed of metallic conductive wires (e.g., aluminum) which surround an interior supporting member (e.g. steel) that provides strength to the conductor 20. As can be appreciated, the capacity of a transmission conductor 20 depends, in part, on the heat of the conductor. For example, the flow of current through a conductor results in heating of the conductor due to ohmic losses. Ohmic losses are proportional to the current squared times the resistance of the conductor. Overhead transmission conductors 20 are further heated by solar absorbance. Improved dissipation of heat by application of a heat emissive coating can reduce the operating temperature of the one or more transmission conductors 20. The coating system 100 is a system to apply a heat emissive coating composition to previously installed transmission conductors 20. The previously installed transmission conductors 20 can be conductors already suspended between pylons 11, 12, 13 and conducting electricity.

FIG. 2 depicts a schematic view of a UAV 30 useful to coat overhead transmission conductors 20. Generally, a UAV is an aircraft with no pilot on board. UAVs can be remotely controlled by a pilot or ground station or can be controlled autonomously from a control unit. As can be appreciated, different types of UAVs can be constructed including planes as well as single or multirotor (e.g., quadcopter) helicopters. Multirotor helicopters can hover and translate in multiple directions. A UAV useful for the system described herein can operate within any applicable regulations and policies including, for example, the regulations and polices of the Federal Aviation Administration ("FAA") when operated in the United States. In certain embodiments, a UAV can have a mass of about 55 pounds or less and can be considered a small UAV by the FAA. However, as can be appreciated, larger UAVs can also be suitable when appropriately registered and/or approved of by the relevant regulating authority or authorities.

The UAV 30 of the system 100 can include one or more arms 302, clamps 304, spraying heads (not depicted), control units 308, servo motors 310, propellers 312, digital cameras 314, canister holders 316, coating canisters 318, conduits 320 and valves 322. In certain embodiments, the canister(s) 318 can be refillable. In such embodiments, the canister(s) 318 can be mounted inside the body of the UAV 30 or can be mounted exterior to the body.

According to certain embodiments, one or more arms 302 can be fitted below the UAV 30. Clamp(s) 304 can be fitted at the free end of each of the arms 302 and can be configured to attach to the transmission conductor(s) 20. In certain embodiments, clamp(s) 304 can be an integral part of the arm 302. In certain embodiments, the arm 302 can additionally, or alternatively, be an integral part of the UAV 30. In certain embodiments, the clamp(s) 304 and arm(s) 302 can be removably fitted and both can be below the UAV 30. A clamp 304 can include two semi-circular rotatable jaws 304A, 304B that are sized to grasp the one or more transmission conductor(s) 20. In certain embodiments, a clamp 304 can be in direct contact with conductor. A clamp 304 can be formed of a material which is conductive or non-conductive (e.g., ceramic material). A non-conductive clamp 304 can electrically insulate the body of a UAV 30 from the current flowing in a transmission conductor(s) 20.

In certain embodiments, clamp 304 can be designed to prevent current in the transmission conductor(s) 20 from flowing into the UAV 30 by means of conduction, while allowing for charging of a power pack provided on the UAV 30. In such embodiments, the clamp 30 can be electrically coupled to the transmission conductor(s) 20 through, for example, electrical induction.

In certain embodiments, a clamp 304 can further include two sets of apertures 330, 335. In certain such embodiments, a first set of apertures 330 can contain a retractable cleaning element 306 and a second set of apertures 335 can contain one or more spraying heads (not depicted). The retractable cleaning element 306 within the first set of apertures 330 can clean the transmission conductor(s) 20 and can, for example, remove unwanted dust or dirt particles while moving along the length of the transmission conductor(s) 20. In certain embodiments, the retractable cleaning element 306 can retract within the first set of apertures 330 of the clamp 304 after the cleaning of the transmission conductor(s) 20 is completed. In certain embodiments, a retractable cleaning element 306 can be formed of one or more brushes, scrubbers, scrapers and the like. In certain embodiments, a clamp 304 can include only a set of cleaning elements 306 or a set of spraying heads.

According to certain embodiments, the surface of a conductor can be prepared prior to the application of a coating composition. Exemplarily preparation processes can include chemical treatment, pressurized air cleaning, hot water or steam cleaning, brush cleaning, heat treatment, sand blasting, ultrasound, deglaring, solvent wipe, plasma treatment, and the like. Additionally, in certain embodiments, a primer can be applied to the surface of a conductor before the addition of an improved coating composition. Suitable primers can act as a base coat for the conductor. Examples of suitable primers can include acrylics, polyesters, epoxy, vinyl acrylics, ethylene-vinyl acetate polymers, alkyds, plastisols, and poly(vinyl butyral). In certain embodiments, it can be useful for the surface preparation process to produce a clean but rough surface. A rough surface can increase the adhesion strength of a coating composition to the conductor. In certain embodiments, a suitable surface preparation process can produce variations in the surface depth of the conductor surface of about 3 microns or more.

In certain embodiments, a coating system 100 can include multiple steps. For example, a coating system can include a mapping operation as a first step and a coating operation as a second step. As can be appreciated however, additional steps can be included. For examine, in certain steps, an additional coating operation can occur to apply primer to a conductor in a manner similar to a coating operation.

During a mapping operation, a UAV 30 can detect transmission conductors 20 with a sensor fitted onto the UAV 30. The UAV 30 can be continuously controlled and/or monitored from a remote location during the mapping operation. Examples of suitable sensors for the mapping operation can include one or more of a compass, a GPS, accelerometers, a barometric altitude sensor, electric field detection circuitry, thermal infra-red imaging, video imaging, RF/laser altimeter, acoustic and corona discharge sensing equipment and LIDAR. The sensors can map one or more of the lateral direction, the starting position, the elevation and the undulation of the transmission conductor(s) 20 and can transmit corresponding signals to the control unit 308. In certain embodiments, a control unit 308 of the UAV 30 can be pre-loaded with initial parameters such as the coordinates of a starting location and intermediate points of the transmission conductor(s) 20 and can instruct the UAV 30 to automatically advance towards the starting location of the transmission conductor(s) 20 as soon as the coordinates are read.

A control unit 308 can be included on a UAV 30. The control unit 308 can include a power source (not depicted), a transceiver (not depicted), a processor (not depicted), and a memory storage unit (not depicted) containing an intransient repository and a transient repository. The control unit 308 can follow pre-determined rules and guidelines from an intransient repository of the control unit 308 and generate system processing commands.

In certain embodiments, the flight of the UAV 30, the dispensing of coating fluid and the movement of the clamps 304 can be controlled by servo controlled motors 310 fitted to the UAV 30. The movement of the servo motors 310 can be controlled by the control unit 308 or can be controlled by input from a ground support station 40. The UAV 30 can be fitted with one or more propellers 312 which are driven by servo motors 310.

A ground support station 40 can include a control system (not depicted) to communicate with a processor of a control unit 308 on a UAV 30. After the detection of the starting position of the transmission conductor(s) 20, the processor can command the UAV 30 to slowly move towards the transmission conductor(s) 20 and can further command the UAV 30 to operate the clamp 304 for clenching of the transmission conductor(s) 20 by means of the jaws 304A, 304B of the clamp 304.

In certain embodiments, a clamp 304 can also include one or more sensors (not depicted) to accurately map the position and coordinates of a transmission conductor(s) 20. Similar sensors can additionally, or alternatively, be located in other components of the UAV. Examples of the one or more sensors can include a compass, GPS, RF sensor, LIDAR or any position sensor. The one or more sensors can transmit the mapped positional coordinates of the transmission conductor(s) 20 to the processor of the control unit 308.

Other sensors can also be included on a UAV 30. For example, a clamp 304 can include a force sensor that detects when complete clamping of the UAV 30 to the transmission conductor(s) 20 occurs.

For the mapping operation, once the clamp 304 clenches the transmission conductor(s) 20, the UAV 30 can begin moving along the length of the transmission conductor 20 in an operative forward direction. In certain embodiments, an arm 302 and/or a clamp 304 can have at least one degree of freedom to securely hold the transmission conductor(s) 20 when the transmission conductor(s) 20 is subjected to swaying or undulation.

The processor of the control unit 308 can receive signals transmitted by the sensors fitted on the UAV 30 and within the clamp 304 and can store information corresponding to the received signals in the control unit 308. In certain embodiments, the control unit 308 can be programmed with an initial training phase where the coordinates of the pylons/towers 10, 11, 12 and the transmission conductor(s) 20 are pre-loaded. The control unit 308 can also include a dynamic learning phase where the information stored in the transient repository is continually updated in accordance with the information received from the various sensors fitted on the UAV 30 and within the clamp 304. The initial training phase and the dynamic learning phase of the system 100 ensure that the system 100 is continuously improving itself organically and provides the system 100 with artificial intelligence.

In certain embodiments, the transceiver of the control unit 308 can be configured to communicate with an interfacing unit of the control system provided on the ground support station 40. In certain embodiments, an interfacing unit can be used to override the system 100 and thereafter, the UAV 30 of the system 100 can be manually controlled. In yet other certain embodiments, the interfacing unit can be used to overwrite the data related to the positional coordinates of the transmission conductor(s) 20 in the transient repository of the control unit 308. In certain embodiments, the transceiver of the control unit 308 can communicate with control units of other UAVs of the system 100, if any.

The dotted lines shown in the FIG. 1 represents an example path of a UAV 30 along the length of transmission conductor(s) 20. The UAV 30 in mapping mode can move swiftly and steadily along the length of the transmission conductor(s) 20 between the two pylons/towers 10, 11. The UAV 30 can detect the end of the transmission conductor(s) 20 by means of stored information as well as sensors such as a digital camera 314 fitted to the UAV 30. The UAV 30, can slow down the forward movement along the length of the transmission conductor(s) 20 after detecting the end of the transmission conductor(s) 20 or after detecting the presence of the pylon/tower 11 by the digital camera 314. At this point, the UAV 30 can be directed to stop moving along the length of the transmission conductor(s) 20 and to start hovering in a stationary mode. Subsequently, the control unit 308 can command the UAV 30 to unclamp from the transmission conductor(s) 20 and move in an operatively upward or sideward or downward direction to cross over the pylon/tower 11. After crossing over to the other side of the pylon/tower 11, the UAV 30 can reinitiate the mapping process by re-clamping to the transmission conductor(s) 20. In one embodiment, the sensors fitted on the UAV 30 can be configured to transmit signals corresponding to the positional coordinates of the UAV 30 in accordance with the movement of the UAV 30 during the mapping operation. The processor can receives the signals transmitted by the sensors and can store the information in the transient repository of the control unit 308 of the UAV 30.

In certain embodiments, the processor can command the UAV 30 to stop moving when any undesired obstructing element such as a vibration damper is detected by a sensor. The data related to the positional coordinates of the transmission conductor(s) 20, elevation of the transmission conductor(s) 20 from the ground, direction of displacement of the UAV 30, presence of any obstructing element on the path of the UAV 30 can be stored in the control unit 308. Once the positional coordinates, elevation, and direction of displacement of the transmission conductor(s) 20 are successfully and accurately mapped, the UAV 30 can be instructed by the processor of the control unit 308, to traverse the mapped path and coat the transmission conductor(s) 20 with a coating material.

As can be appreciated, the coating system 100 can omit the mapping step in certain embodiments if sufficient data is known ahead of time. In such embodiments, the UAV 30 can proceed directly to a coating step.

During the coating operation, a coating material can be sprayed on the transmission conductor(s) 20 via multiple spraying heads fitted within the second set of apertures 335 of the clamp 304. Examples of suitable coating materials are described in co-pending U.S. Patent Application Publication Nos. U.S. 2018/0118952, U.S. 2018/0112078, U.S. 2018/0112077, U.S. 2017/0321077, U.S. 2017/0137659, U.S. 2016/0042837, U.S. 2015/0353737, and U.S. 2014/0041925; each of which are incorporated herein by reference. In certain embodiments, the coating material can be selected from a group of materials/fluid that can cause high dissipation of heat from the transmission conductor(s) 20. For example, the coating material can include homopolymers, copolymers and reactive or grafted resins or inorganic materials (e.g. ceramics), which can be used as a virgin material or in combination with suitable filters such as metal oxides, metal nitrides, metal borides, metal silicides, metal carbides and the like.

The second set of apertures 335 of the clamp 304 can be connected to a coating canister 318 via a conduit 320. In certain embodiments, a coating canister 318 is mounted on the canister holder 316, which is fitted on the UAV 30. In certain embodiment, the canister holder can be an integral part of the UAV 30. The valve 322 connected to the coating canister 318 can pump the coating material/fluid from the coating canister 318 to the second set of apertures 335 via the conduit 320 for spraying the coating material/fluid on the transmission conductor(s) 20. In certain embodiments, the coating canister 318 can include pressurized fluid coating material/fluid dispersed in an aerosol which can be transferred directly from the coating canister 318 to the second set of apertures 335 via the conduit 320 by a pressurized flow mechanism. In certain embodiments, the control unit 308 can determine the amount of coating required to coat the transmission conductor(s) 20 via the multiple spraying heads. The control unit 308 can determine the amount of coating required from the mapped length of the transmission conductor(s) 20, the thickness of coating required and the speed of the UAV 30. In other certain embodiments, the UAV 30 can include a pump to transfer fluid from the coating canister to the overhead transmission line.

According to certain embodiments, during the coating operation, the UAV 30 can move at a comparatively slower and controlled speed than the mapping operation along the length of the transmission conductor(s) 20 between a pylon/tower 10, 11, 12. The UAV 30 can further reduce the movement speed along the length of the transmission conductor(s) 20 just before reaching the end of the transmission conductor(s) 20 or when near the pylon/tower 11. When the UAV 30 starts slowing down the operative forward movement, the processor of the control unit 308 can command the valve 322 to slow down the transfer of the coating material/fluid from the coating canister 318 to the second set of apertures 335. When the UAV 30 reaches the end of the transmission conductor(s) 20 or pylon 11, 12, or 13, the valve 322 can be entirely closed. After valve 322 stops the transfer of coating material, the UAV 30 can unclamp from the transmission conductor(s) 20, cross over the pylon/tower 11, locate and re-clamp the transmission conductor(s) 20 and resume coating.

In certain embodiments, cleaning and coating of the transmission conductor(s) 20 can be performed by separate UAVs. In certain embodiments, two or more layers of a coating composition can be applied to the transmission conductor(s) 20 with each of the layers applied by a separate UAV. Alternatively, a single UAV can coat multiple layers or be configured to both clean and coat a transmission conductor using a single pass or multiple passes.

The ground support station 40 that acts as a base station for the UAVs 30 can contain a stock of coating material (e.g., as a stack of coating canisters 50) and spare power packs. In certain embodiments, the coating canister 318 on the UAV can have a sensor that senses the level of coating material/fluid present in the coating canister 318 at any given time and can relay the same information to the control unit 308. In such embodiments, if the level of coating material/fluid falls below a pre-determined level, the control unit 308 can instruct the UAV 30 to undock the mounted coating canister 318 and obtain another from the stock of coating canisters 50 available at the ground support station 40. In certain embodiments, a power pack can be removably fitted on the UAV 30 and can also have a sensor that senses the level of residual power at any given time. In certain such embodiments, when the residual power of the power pack falls below a pre-determined level, the control unit 308 can instruct the UAV 30 to hover down towards the ground support station 40 and refuel/repower itself automatically by un-docking the spent power pack and docking one of the spare power packs. In certain embodiments, the refueling/repowering of the UAV 30 can also be done manually at the ground support station 40 in a swift manner upon receiving the warning information from the in-build sensor. In certain embodiments, the UAV 30 can recharge a power pack without removing the power pack. In certain embodiments, the UAV can facilitate drying of the coating composition (film). In certain embodiments the drying helps in curing the coating composition.

As can be appreciated, other variations are possible. For example, a UAV 30 can temporarily discontinue coating operations to recharge from the transmission conductors 20 when the residual charge is low. In certain embodiments, the UAV 30 can rely on sensors to determine the optimal time to refill with additional coating composition. For example, a UAV 30 can only refill with additional coating composition when it has reached a pylon and does not have sufficient coating composition to coat the span of conductor between the current pylon and the next pylon without refilling.

In certain embodiments, where the transmission conductor(s) 20 have a low operating temperature of about 0° C. to about 100° C., about 10° C. to about 80° C., about 20° C. to about 50° C., or is at about room temperature (e.g., about 23° C.), the UAV 30 can facilitate heating of a film (or layer) of coating material/fluid that was applied to the transmission conductor(s) 20 during the coating operation. Heating can ensure an even and complete coat on the transmission conductor(s) 20. In particular, the clamp 304 can heat the transmission conductor(s) 20 inductively or resistively to dry the coating material.

Alternatively, in embodiments where the transmission conductor(s) 20 have a high operating temperature of about 100° C. or more, about 150° C. or more, about 200° C. or more, or about 250° C. or more, the UAV 30 can facilitate cooling of the coated transmission conductor(s) 20. Cooling can ensure an even and complete coat on the transmission conductor(s) 20. In such embodiments, the clamp 304 can blow air on to the applied film of the coating material/fluid to initiate cooling.

As can be appreciated, the operating temperature of a transmission conductor 20 can vary depending upon the conductor design. For example, cooler operating temperature transmission conductors can be aluminum conductor steel reinforced ("ACSR") cables while higher operating temperature transmission conductors can be aluminum conductor steel supported ("ACSS") cables.

In certain embodiments, the heating or cooling of the transmission conductor(s) 20 can be performed by the same UAV 30 applying the coating composition to the transmission conductor(s) 20. As can be appreciated however, the heating or cooling of the transmission conductor(s) 20 can also be performed by one or more separate UAV(s). In such embodiments, additional UAV(s) can move behind the UAV applying the coating composition onto the transmission conductor(s) 20. In such embodiments, each of the UAVs can be separated either by a pre-defined distance or by a pre-defined time delay. As can be appreciated, similar methods of ensuring separation can also be used with a surface preparation UAV or with UAV's applying additional coatings of the coating composition. In certain embodiments, each UAV can also use sensors and/or communicate with other UAVs to ensure separation.

In certain embodiments, a UAV can determine whether appropriate conditions exist for coating the transmission lines. For example, a UAV can determine whether conditions are excessively windy or rainy. In making such determinations, the UAV can also determine whether the coating composition will adequately adhere to the transmission line. For example, a PVDF based coating composition can require the transmission line to be at a relatively low temperature.

The coating system as described herein can be used to coat a variety of transmission lines. For example, a UAV can be used to coat a bundled transmission conductor in certain embodiments. In such embodiments, each of the various steps including surface preparation, coating, mapping, drying, cooling, heating, curing, priming and cleaning can be performed similarly with only minor modification such as different line speeds.

The application of a coating composition to an overhead transmission line can be extremely beneficial. For example, transmission lines coated by a suitable coating composition can operate at least 5 degrees cooler than an uncoated transmission line. Such improvements can improve the ampacity of the line, and can reduce sag from heating. Other benefits can include reductions to transmission line repair and maintenance.

Other benefits can be applied to an overhead transmission line when alternative coating compositions are applied. For example, application of an ice resistant coating composition can reduce the accumulation of ice on overhead conductors and can reduce the danger of sag or falling ice.

As can be appreciated, the coating system is also safer than conventional methods which require workers to be elevated to dangerous heights and work on live wires. The coating system described herein presents no injury risk to humans and can allow for rapid coating of live transmission lines.

As can be appreciated, different coating compositions can be applied and optionally cured in different manners. For example, certain coatings can be applied by a spray coating process while others can be applied with a dip coating process. According to certain embodiments, UAVs can be adapted to meet the requirements of the coating composition selected for a particular coating operation. As can be further appreciated, certain coating compositions can be cured, or dried, using elevated temperatures or steam, while other coating compositions can be allowed to cure at ambient temperatures without interaction from a UAV. UAV's can be adapted and programmed to match the needs of such coating compositions.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A system comprising:
    an unmanned aerial vehicles ("UAV") comprising:
        an overhead conductor clamping member comprising:
            a pair of jaws, wherein each jaw of the pair of jaws comprises an interior surface; and
            a first set of coating apertures, wherein each coating aperture of the first set of coating apertures is disposed on the interior surface of one of the jaws; and
        a first canister fillable with a first coating composition and fluidly connected to the first set of coating apertures via a first conduit; and
        wherein the overhead conductor clamping member is configured to surround an installed overhead conductor to apply the first coating composition, and wherein at least one of the jaws is pivotable relative to the other jaw.

2. The system of claim 1 further comprising a ground support station comprising one or more of an electric charging port, a replacement power pack, and a supply of the first coating composition.

3. The system of claim 2, wherein the supply of the first coating composition is in a replacement canister that is selectively interchangeable with the first canister of the UAV.

4. The system of claim 1, wherein the overhead conductor clamping member further comprises a set of cleaning apertures, wherein retractable cleaning elements are at least partially disposed within the cleaning apertures.

5. The system of claim 1, wherein the overhead conductor clamping member comprises a heating member configured to heat the installed overhead conductor.

6. The system of claim 1, wherein the overhead conductor clamping member comprises a fan configured to cool the installed overhead conductor.

7. The system of claim 1, wherein the overhead conductor clamping member is configured to electrically couples to the installed overhead conductor to facilitate recharging of the UAV.

8. The system of claim 1, wherein the coating apertures comprise spaying heads that facilitate selective application of the first coating composition to the installed overhead conductor.

9. The system of claim 1, wherein the overhead conductor clamping member further comprises a second set of coating apertures and wherein the UAV further comprises a second canister fillable with a second coating composition and fluidly connected to the second set of coating apertures via a second conduit.

10. The system of claim 1, wherein the first canister is pressurized or wherein the UAV comprises a pump that facilitates delivery of the first coating composition from the first canister to the first set of coating apertures.

* * * * *

UNITED STATES PATENT AND TRADEMARK OFFICE
CERTIFICATE OF CORRECTION

PATENT NO. : 10,186,348 B2
APPLICATION NO. : 15/406429
DATED : January 22, 2019
INVENTOR(S) : Cody R. Davis et al.

Page 1 of 1

It is certified that error appears in the above-identified patent and that said Letters Patent is hereby corrected as shown below:

In the Specification

Column 1, Line 67, change "Tillable" to --fillable--;

In the Claims

Column 10, Claim 1, Line 13, change "vehicles" to --vehicle--;

Column 10, Claim 7, Line 48, change "couples" to --couple--; and

Column 10, Claim 8, Line 52, change "spaying" to --spraying--.

Signed and Sealed this
Nineteenth Day of March, 2019

Andrei Iancu
*Director of the United States Patent and Trademark Office*